United States Patent [19]
Paul et al.

[11] Patent Number: 5,056,314
[45] Date of Patent: Oct. 15, 1991

[54] INTERNAL COMBUSTION ENGINE WITH COMPOUND AIR COMPRESSION

[76] Inventors: Marius A. Paul; Ana Paul, both of 1100 Orangethorpe Ave., Ste. 140, Anaheim, Calif. 92801

[21] Appl. No.: 428,853
[22] Filed: Oct. 30, 1989
[51] Int. Cl.⁵ .................................... F02B 37/04
[52] U.S. Cl. .................................... 60/609; 60/605.1; 123/561
[58] Field of Search .................... 60/605.1, 609; 123/559.1, 561

[56] References Cited

U.S. PATENT DOCUMENTS

| | | |
|---|---|---|
| 2,977,943 | 4/1961 | Lieberherr ............... 123/51 BA |
| 3,180,079 | 4/1965 | Freeman .................. 123/561 X |
| 3,727,399 | 4/1973 | Brille et al. ............. 60/609 X |
| 4,502,283 | 3/1985 | Wandel ................... 60/609 |
| 4,633,844 | 1/1987 | Okimoto . | 
| 4,656,992 | 4/1987 | Oonaka et al. . |
| 4,766,729 | 8/1988 | Miyajima ................ 123/559.1 |
| 4,809,646 | 3/1989 | Paul et al. . |
| 4,843,821 | 7/1989 | Paul et al. .............. 123/559.1 |

FOREIGN PATENT DOCUMENTS

| | | | |
|---|---|---|---|
| 153429 | 8/1985 | Japan ...................... 60/609 |
| 140821 | 6/1988 | Japan ...................... 123/561 |

*Primary Examiner*—Michael Koczo
*Attorney, Agent, or Firm*—Bielen, Peterson & Lampe

[57] ABSTRACT

An internal combustion engine with a supercharging system that includes both a turbocompressor and a positive displacement rotary compressor of the Wankel type wherein the rotary compressor provides compressed air to the engine at low operating speed and the turbocompressor provides sufficient compressed air at high operating speeds to drive the rotary compressor while providing sufficient air to power the engine.

6 Claims, 2 Drawing Sheets

INTERNAL COMBUSTION ENGINE WITH COMPOUND AIR COMPRESSION

BACKGROUND OF THE INVENTION

This invention relates to an internal combustion engine in which the engine is supercharged by both a rotary blower and a turbocharger wherein the rotary blower comprises a Wankel-type compressor.

In prior art engines various combinations of precharging devices have been proposed to compress air delivered to internal combustion engines of the reciprocal piston type. The most common charging system is a turbocharger which charges the engine using a centrifugal compressor driven by a turbine that is powered by exhaust gases.

In a more complex system applicants have proposed using both a turbocharger and a positive displacement rotary expander/compressor, which like the turbocharger has one side of the unit driven by the exhaust gases and the other side operated as a compressor.

The unique combination of the turbocharger and the rotary compressor/expander was considered to comprise the best combination of the turbocharger and a Wankel-type unit. However, unexpected results were obtained when both sides of the rotary Wankel-type unit were used as a compressor and driven by power from the engine shaft.

At lower speeds of operation, the turbocharger delivers no compression and all of the compression is provided by the rotary compressor operating as a blower. At mid-range speeds both the turbocharger and the rotary compressor contribute and develope an enormous compression. At high speeds, the turbocharger develops sufficient compressed air to not only power the engine, but drive the rotary compressor which operates as an air motor.

The requirement for a "waste gate" which allows exhaust gases to bypass the turbine to prevent overrotation of the turbocompressor unit is eliminated. The once lost power is now recaptured by driving the rotary compressor connected to the engine shaft, adding mechanical energy through the engine shaft to the engine.

In effect, the combination system proposed is its own self regulator and is a substantial improvement over existing systems such as engines, utilizing a Roots-type blower or the hyperbar engine utilizing a gas turbine engine in combination with a reciprocal engine. The invented engine responds to operating conditions with sufficient quantities of air and avoids the lag encountered with turbochargers or the air supply at high power cost encountered with most conventional blowers.

SUMMARY OF THE INVENTION

This invention relates to an internal combustion, piston engine having a supercharging system that combines a conventional type turbocharger in series with a Wankel-type, positive displacement compressor. The turbocharger, driven by exhaust gases from the engine supplies air to the positive displacement rotary compressor, for convenience called the rotary compressor. The rotary compressor further compresses the air and delivers highly compressed air to the reciprocating unit. The rotary compressor is connected to the shaft of the engine to allow the compressor to compress air at low speeds when the turbocompressor is effectively nonfunctional. While such operation was expected, the extraordinary level of compression was surprising with an overabundance of air to provide smokeless operation at the lowest speeds.

What was wholly unexpected was the extremely high torque operation at mid and upper ranges of operation. In the low to mid speed ranges, the turbocompressor becomes functional due to sufficient exhaust gasses to drive the turbine and hence the attached centrifugal compressor. The compressed air helps drive the rotary compressor, which further compresses the air. At a certain point at higher speed operation, the rotary compressor extracts no energy from the drive shaft and is driven by the compressed air from the turbocompressor. Finally, at peak performance operation, the large quantity of high-pressure exhaust gases drives the turbocompressor and the excess energy that is normally vented is used to compress air that drives the rotary compressor to an extent that energy is returned through the mechanical connection of the rotary compressor with the drive shaft. An unprecedented power density is therefore achieved by the engine at output drive shaft through the combination of the operation of the reciprocator and the rotary compressor acting as an air motor. Low emission levels are achieved by the overabundance of air at all levels of rotations and loads.

DESCRIPTION OF THE PREFERRED EMBODIMENTS

Figure 1:
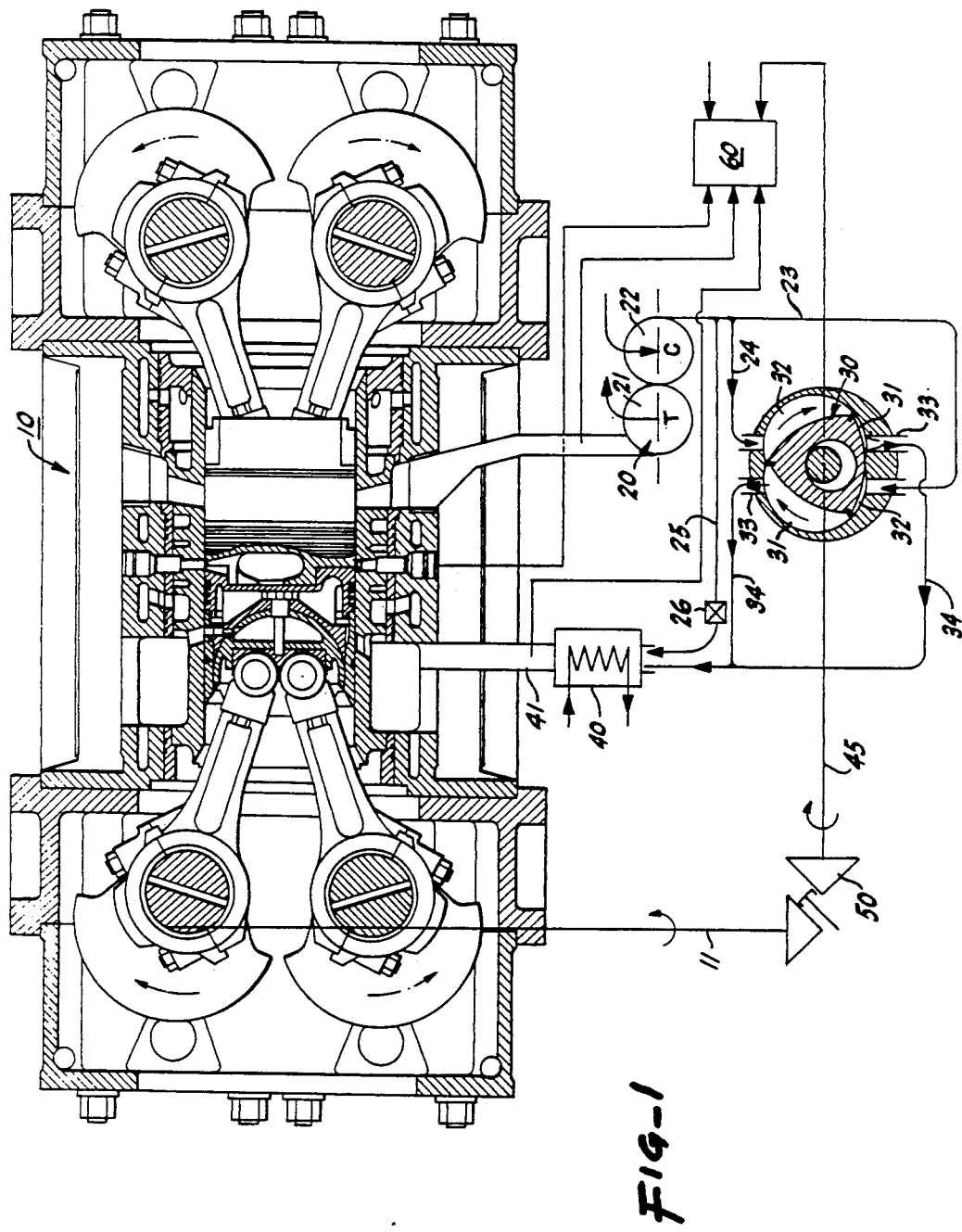
FIG. 1 is a cross sectional view of an opposed piston reciprocator with the turbocompressor and rotary compressor/air motor.

Referring to FIG. 1 the high pressure reciprocator with a drive shaft 11 10 is shown with a conventional-type turbocharger 20, having a gas turbine 21 and a turbocompressor 22, and a Wankel-type, three-lobe, epitrochoidal, rotary compressor 30 as shown. The rotary compressor 30, more accurately a rotary compressor/air motor 30, has compressor sides 31 and expander sides 32 and has a drive shaft 45 mechanically connected to the drive shaft 11 of the reciprocator by a continuously variable transmission 50. Compressed air from the rotary compressor is supplied to the reciprocator through an intercooler 40 to increase the air density to the reciprocator 10. The reciprocator is of the preferred type described in my U.S. Pat. No. 4,809,646, issued Mar. 7, 1989 entitled, High Pressure Reciprocator.

The air connection from the turbocharger 22 is connected through air conduits 23 and 24 to the rotary expander sides 32 of the rotary compressor. The air is further compressed in the rotary compressor and delivered from the rotary compressor sides 31 of the compressor through valves 33 and air conduits 34 to the intercooler 40. After passing through the intercooler 40 the compressed and cooled air is delivered to the engine through air conduit 41.

For flexibility of operation, the rotary compressor can be bypassed by direct supply of compressed air from the turbocharger through air conduit 25 with valve 26, which is controlled by microprocessor 60 for partial or complete bypass. Microprocessor 60 includes sensors to optimize the operation of the engine according to speed, load, torque demand and other conventional input. While direct mechanical connection of the rotary compressor and fixed operation of the turbocharger compression through the rotary compressor provides extraordinary improvement of operation, the microprocessor allows refined control not only of performance, but of emissions.

Figure 2:
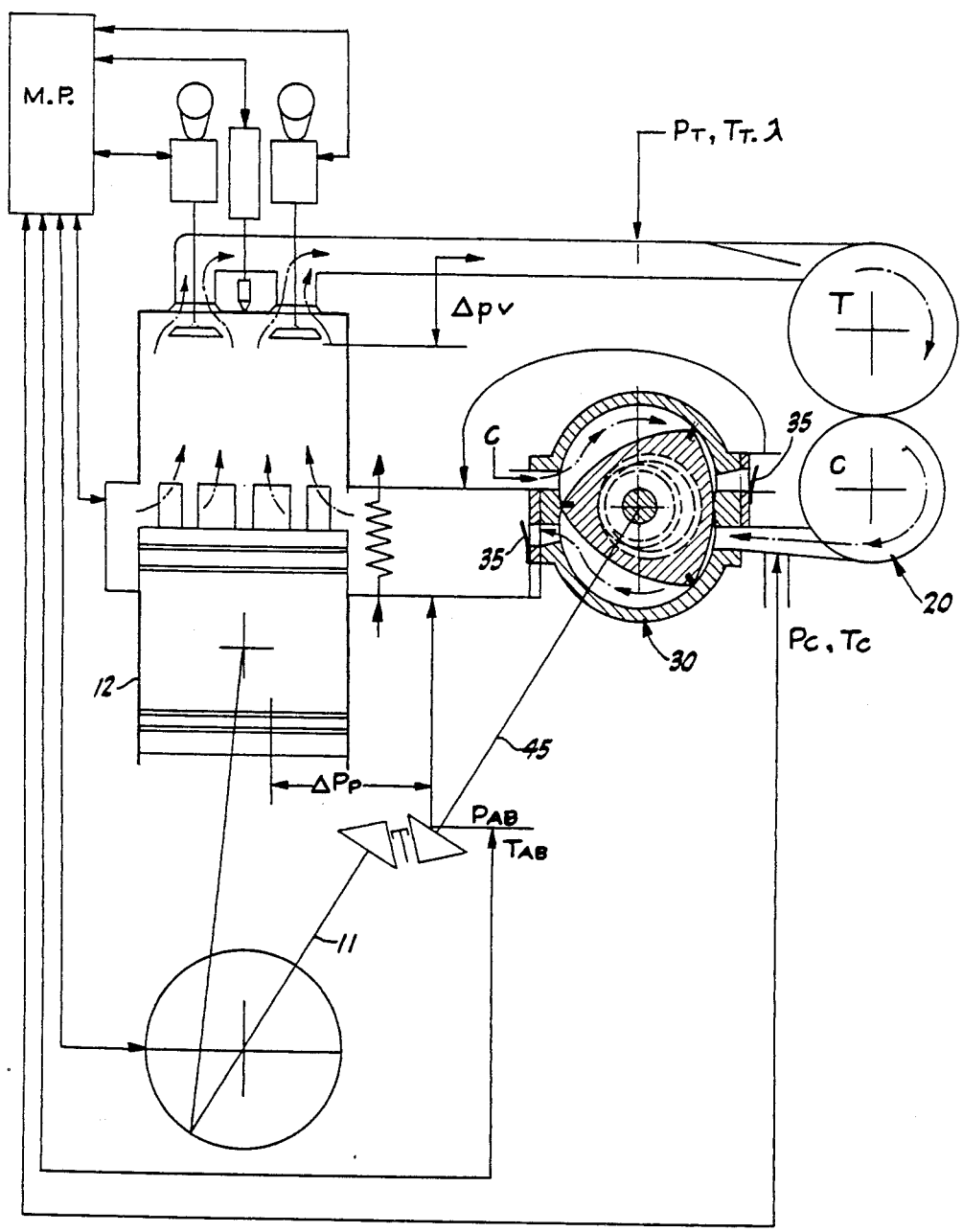
FIG. 2 is a schematic illustration of a conventional reciprocator with the turbocompressor and rotary compressor/air motor.

Referring now to FIG. 2, a similar solution is provided for a conventional reciprocator 12 connected mechanically to a Wankel-type, three-lobe, epitrochoidal, rotary compressor 30 and turbocharger 20. The rotary compressor/air motor 30 is directly connected to an intercooler 40 through flap valve 35. The operation is similar to that described with reference to the embodiment of FIG. 1. In operation the engine goes through three general operating phases. First, at greater than fifty percent load, $Pc = Pt + \Delta pv + \Delta pp = PAB$ where zero mechanical work required for compression. Second, at full power $Pc > Pt + \Delta pv + \Delta pp = PAB$ where compound positive mechanical work transferred to the crankshaft. Third, at part load $PAB = Pt + \Delta pv + \Delta pp > Pc$ where negative mechanical compounding and work absorbed from crankshaft.

In a test with a 353 Detroit Diesel engine rated at 70 hp. natural aspiration, and 115 hp. turbocharged, approximately 212 hp. was developed without increased fuel consumption with the compound compression system of this invention. The engine was a 3 cylinder, two-cycle engine with 53 cu. in./cylinder. The rotary compressor had three lobes and displaced 16.8 liters of air on each rotation. The rotary compressor was connected to the reciprocator on a 3:1 reduction with three rotations of the engine to each rotation of the rotary compressor. The turbocharger provided a compression of 4.7 atm. at optimum operation and delivered compressed air between 800 and 2200 r.p.m. of engine speeds. When reaching 80–90% of optimum operation the turbocharger began driving the rotary compressor and returning power to the engine shaft by the air motor action of the rotary compressor.

Throughout the operating range of the engine excess air was generated and emissions minimized.

What is claimed is:

1. An internal combustion engine in combination with a compound air compression system, comprising:

a) a reciprocator with at least one cylinder, at least one piston reciprocal in the cylinder and a combustion chamber formed in substantial part by portions of the piston and cylinder, the reciprocator having a drive shaft;

b) a rotary compressor having a drive shaft mechanically coupled to the drive shaft of the reciprocator, the rotary compressor having a Wankel-type, three-lobe, epitrochoidal configuration with compressor sides for compressing an intake gas, and expander sides for expanding an intake gas with the compressor sides having a conduit connected to the reciprocator for supplying compressed air to the reciprocator;

c) a turbocharger with a gas turbine and a turbocompressor, the turbocompressor having an air conduit connected to the expander sides of the rotary compressor; and a bypass conduit with a valve means connecting the turbocharger to the reciprocator for supplying compressed air directly to the reciprocator wherein the drive shaft of the reciprocator and the drive shaft of the compressor have connecting means for transmitting mechanical energy to the reciprocator at mid to high operating speeds of the engine when the turbocharger supplies compressed air to the rotary compressor and, at least in part, drives the rotary compressor.

2. The engine of claim 1 wherein the reciprocator is an opposed piston engine having a structure designed to withstand state-of-the art and higher combustion chamber pressures.

3. The engine of claim 1 including a microprocessor wherein the valve of the bypass conduit is connected to the microprocessor for controlled flow of compressed air through the bypass conduit.

4. The engine of claim 1 wherein the connecting means includes a continuously variable transmission wherein the rotary compressor is connected to the shaft of the reciprocator through the continuously variable transmission.

5. The engine of claim 1 including a microprocessor for controlling the air supply to the reciprocator.

6. The engine of claim 1 wherein the air conduit between the rotary compressor and the reciprocator includes an intercooler to increase the density of air supplied to the reciprocator.

* * * * *